Sept. 7, 1943.   H. R. KIEHL   2,329,057
TEMPERED HOLLOW GLASS ARTICLE
Filed Jan. 29, 1941
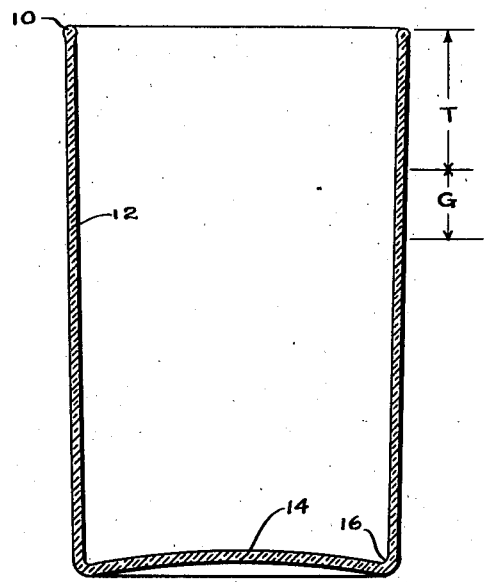
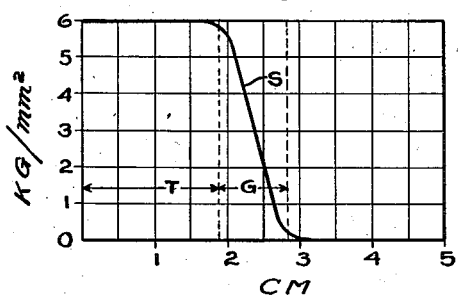
Inventor
HARRY R. KIEHL
By
F. H. Knight
Attorney Patented Sept. 7, 1943

2,329,057

UNITED STATES PATENT OFFICE 2,329,057

TEMPERED HOLLOW GLASS ARTICLE

Harry R. Kiehl, Corning, N. Y., assignor to Corning Glass Works, Corning, N. Y., a corporation of New York Application January 29, 1941, Serial No. 376,535

3 Claims. (Cl. 65—13)

This invention relates to tempered glassware and particularly to tempered hollow glass articles of various shapes; such as, tubes, drinking glasses, glass bowls, and the like.

It has long been known that glass articles may be strengthened so that their ability to resist thermal and mechanical shock is greatly increased by setting therein permanent stresses so that the surface of the glass is in compression balanced by an interior zone which is in tension. This may be accomplished by heating the glass to a temperature near its softening temperature and then suddenly chilling the glass either by means of air jets or quenching baths to a temperature below its strain point. In recent years these principles have been employed in the manufacture of safety plate glass for vehicles of all sorts and of glass cooking utensils for top-of-stove use where they are in direct contact with a localized heat source.

Attempts have been made to apply these principles to other glass articles but difficulties have been encountered, particularly in the case of hollow glass articles of relatively small size or having relatively small openings in their walls for access to the inner surface, for under such circumstances it has been found extremely difficult to obtain uniform stress conditions at all points on the surfaces of the articles, particularly on the interior surfaces thereof, with the result that the desired increase in strength has not been attained and in some instances the tempered articles have proved to be weaker than similar annealed articles. These considerations have little or no bearing on the successful annealing of glass articles. Since the rate of heat transfer in annealing operations is very slow, the shape of an article and the size of the opening by which access is had to its interior is unimportant.

The object of the present invention is a hollow glass article which can be manufactured with the ease of an ordinary annealed article while at the same time possessing many of the advantages heretofore found only in fully tempered glassware.

The present invention includes among its features a hollow glass article having at least one zone in its walls which has been tempered so that both its outer surfaces are permanently set in compression balanced by an interior zone permanently set in tension, and having a contiguous zone of decreasing maximum compressive stress in its surfaces, the maximum compressive stress gradient in said latter zone being not greater than 15 kilograms per square millimeter per centimeter. In the preferred embodiment of the invention, this zone of decreasing compressive stress merges directly into the stress-free body of the article without appreciable tensile stress in either surface thereof.

In the present invention it has been found that in many instances glass articles may be greatly strengthened over their annealed strengths with a minimum of difficulty by determining those zones in the walls of the articles in which the greatest stresses are developed due to the shocks and strains encountered in use and by tempering only those zones so that their surfaces have set therein a permanent compressive stress which must be overcome before breakage of the article will occur. This can be done with relative ease by first annealing the entire article to remove all residual stress therefrom and then reheating the zone which it is desired to temper until its temperature is near the softening temperature of the glass from which it is made. This heated zone is then rapidly chilled by well known means to a temperature below the strain temperature of the glass, thereby setting it in a permanent condition of stress such that its surfaces are in compression balanced by an inner portion which is in tension. This process can be performed much more easily than the tempering of the entire article since the application of heating and chilling media to the desired zones may be determined solely by the requirements for the production of the desired results in that particular zone without regard for the effect that such application might have on the tempering of some other portion of the article.

For example, in Figure 1 of the accompanying drawing is shown in section a drinking glass of customary configuration having a rim 10, side walls 12, and bottom 14. The juncture between the side walls and bottom is a relatively sharp corner 16. If such a tumbler were to be completely tempered so that all portions of its inner and outer surfaces were placed in compression, extreme care would have to be used in heating the article to be sure that its thin walls near the rim were heated to the same temperature as its much thicker bottom. In cooling such an article it would be necessary to direct special jets of cooling fluid into the corners 16 and even then, unless carefully regulated, sufficient tension might be found in this inner corner to result in spontaneous breakage or fracture on the slightest scratch.

By first annealing the tumbler all possibility of uneven, miscellaneous stresses throughout the body of the article is eliminated. A zone T including the rim and upper portion of the side wall of the tumbler may then be uniformly heated by the localized application of a flame or other source of heat without raising the remainder of the article to a temperature at which permanent stresses can be set therein. This zone can then be chilled by the application of jets of cooling air or equivalent means to set the desired degree of compression therein and it makes no difference if this cooling medium is applied to other annealed sections of the article as well, inasmuch as their temperatures are too low to result in a permanently established stress. The duration and intensity of the heating and chilling effects produced on one or both surfaces of the article should be so proportioned as to produce equivalent stress conditions at opposed points on both surfaces of the article.

While it is evident that far more types of articles can be successfully tempered in limited zones than could be completely and uniformly tempered, it has been found that care must be exercised to limit the rate of stress gradient between tempered and annealed sections of the ware. If the stress gradient is too high, forces may be induced in the ware in the direction of the gradient which actually weaken the resulting article. In the tumbler shown in Figure 1, if the gradient existing in zone G between the tempered zone T and the body of the tumbler is too high, the entire zone T may crack off as a ring from the remainder of the tumbler and this tendency is increased if the surface of the glass is scratched in any way when in use.

It has been found that restricted zones can be tempered without danger of subsequent breakage if the compression stress gradient in the adjacent intermediate zone or zones does not exceed the value of 15 kilograms per square millimeter per centimeter. Such zones of graded stress may be formed by heating them to lower, continuously varying temperatures than the temperature to which the main zone is heated and then subjecting this zone to the same chilling media employed in chilling the principal zone it is intended to temper. The value of 15 kilograms is believed to be fairly critical and above it the tendency of the tempered zone to "ring off" from the body of the ware, either spontaneously or after abrasion, is very marked.

Figure 2 of the accompanying drawing is a graph illustrating the present invention as applied to the tumbler of Figure 1. The ordinates of this graph represent values of compression found in the surface of the tumbler wall while the abscissas represent distances down the tumbler wall from the rim thereof. The curve S indicates that the stress in the zone T is substantially uniform up to its edge where it blends into the intermediate zone G. In this zone the compression diminishes uniformly at a rate of approximately 8 kilograms per square millimeter per centimeter throughout that portion of its length in which the rate of stress variation is substantially linear which value is the maximum found in the entire zone G. Between this region of substantially linear stress variation and the annealed body of the tumbler the rate of stress variation again tapers off until the stress free zone is reached. It will be noted that this portion of the stress distribution curve does not cross the line of zero stress and become negative. Any appreciable negative or tensile stresses in this zone seriously weakens the tempered article, usually to a value well below the strength of an equivalent annealed article. Any tensile stress in excess of 0.5 kilogram per square millimeter is considered "appreciable" and, if present, will promote breakage of the article.

The methods by which the stresses in the various zones may be determined are those normally employed in the study of stresses in glass. Where the values of maximum stress in the ware will permit, it is preferred to cut a longitudinal strip approximately 4 mm. wide from the tempered article extending through the stressed zones and into the adjacent annealed zone or zones. The edges of this sample are then ground and polished so that edgewise observations may be made through the sample at spaced points along its length with a Babinet compensator. In this manner the distribution and intensity of the stresses through any part of the ware may be accurately measured and by making such measurements at spaced points along the sample the stress gradient therein may be determined and plotted. When it is desired to measure the stress distribution in the wall of an article without removing a sample strip thereof satisfactory measurements may be obtained by immersing the entire article in a liquid of the same index or refraction and observing the section in question tangentially. The mean light path through the glass under these circumstances is arbitrarily taken as the length of the chord at a point one-tenth of the thickness of the wall in from the outer surface. Values of stress computed on this basis have been found to check very closely with those obtained by subsequently cutting a narrow test specimen from the section in question. If circumferential stress distributions are desired they may be obtained by this method or by cutting a narrow ring section from the part of the article in question.

In the type of tempering here described, the ratio of compression to tension at a given point usually falls between 1.5 to 1.0 and 2.00 to 1. Thus for a maximum stress gradient of 15 kilograms per square millimeter per centimeter for the outer surface compression the gradient in the internal tension zone will be from 7.5 to 10.0 kilograms of tension per square millimeter per centimeter. Due to this variation with the shape of the stress pattern the limiting values of stress gradient can not be as accurately set forth in terms of tension as in terms of compression but in all cases are believed to fall below the value of 10 kilograms of tension per square millimeter per centimeter.

Tumblers tempered in zones as hereinbefore described have been found to have mechanical strengths when dropped on their rims of from two to three times the strength of corresponding wholly annealed tumblers. In actual service these tumblers have been found to have an effective life up to fifteen times that of similar annealed tumblers in restaurants, bars, and other severe service locations. Such tumblers will even withstand severe surface scratching with silicon carbide crystals and the like without immediate or subsequent spontaneous breakage.

While the present invention has been described with particular reference to drinking glasses it can be applied with equal benefit to a wide variety of tubular and hollow glass articles such as coffee percolator pumps, glass piping, vacuum type coffee maker upper and lower bowls, stem ware, and the like, where the predominant reason for breakage is extreme mechanical stress in a relatively localized zone of the ware.

I claim:

1. A hollow glass article having an opening in the wall thereof, that portion of said wall immediately surrounding said opening having a permanent graded compressive stress set therein while the remainder of said wall is substantially free from any permanent stress, the compressive stress gradient between the more highly stressed and the unstressed sections of said wall not exceeding 15 kilograms per square millimeter per centimeter.

2. A hollow glass article having a portion of its surface permanently set in a condition of graded compressive stress and adjacent portions of its surface being substantially free of permanent stress, the compressive stress gradient between said adjacent portions of surface being less than 15 kilograms per square millimeter per centimeter.

3. A hollow glass article of revolution having a circumferential zone of its wall set in a permanent condition of compressive stress to strengthen the same, said article having a second circumferential zone adjacent said first zone having substantially no permanent stress therein, and an intermediate contiguous zone in which exists a permanent condition of compressive stress varying substantially uniformly from the value of stress in said first zone to the value of stress in said second zone the maximum stress gradient in said intermediate zone being less than 10 kilograms per square millimeter per centimeter.

4. A hollow glass article of revolution having a circumferential zone of its wall set in a permanent condition of stress to strengthen the same, said article having a second circumferential zone adjacent said first zone having substantially no permanent stress therein, and an intermediate contiguous zone in which exists a permanent condition of stress varying substantially uniformly from the value of stress in said first zone to the value of stress in said second zone the maximum stress gradient in said intermediate zone being less than 10 kilograms per square millimeter per centimeter, the surface stresses in said zones being compressive.

5. A hollow glass body having a single opening in the wall thereof, a zone of said wall of substantially uniform width about said opening having its surfaces set in a permanent condition of compressive stress, a second zone of said wall immediately contiguous said first zone having its surfaces set in a condition of compressive stress of decreasing value away from said first zone, the remainder of said article being substantially free from stress, the rate of decrease of compressive stress in said second zone being less than 15 kilograms per square millimeter per centimeter.

6. A hollow glass article of revolution having a relatively thin wall, a circumferential zone of said wall so located that it includes those portions of the wall which are subjected to the maximum working stresses encountered when the article is in use being set in a permanent condition of stress with its surfaces in compression, a second zone immediately contiguous said first zone and having decreasing values of permanent compressive stress in its surfaces in a direction away from said first zone, the maximum compressive stress gradient in said second zone being less than 15 kilograms per square millimeter per centimeter.

7. A hollow glass article of revolution having a relatively thin wall, a circumferential zone of said wall so located that it includes those portions of the wall which are subjected to the maximum working stresses encountered when the article is in use being set in a permanent condition of stress with its surfaces in compression, a second zone immediately adjacent said first zone and having decreasing values of permanent compressive stress in its surface in a direction away from said first zone, the maximum compressive stress gradient in said second zone being less than 15 kilograms per square millimeter per centimeter, the remainder of said article being substantially free from permanent stresses.

8. A drinking glass having its rim and an adjacent zone of its side wall set in a permanent condition of stress such that its surfaces are in compression, the body of the glass being substantially free of permanent stresses, and an intermediate zone in the wall of said glass between the body and rim thereof having decreasing values of compressive stress set in its surfaces from said rim toward said body, the maximum stress gradient in said intermediate zone being less than 15 kilograms per square millimeter per centimeter.

HARRY R. KIEHL.